United States Patent
Chang et al.

(10) Patent No.: US 7,242,500 B2
(45) Date of Patent: Jul. 10, 2007

(54) HALFTONE IMAGE DOWN-SAMPLING

(75) Inventors: Ching-Wei Chang, Vancouver, WA (US); Jiaping Song, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 922 days.

(21) Appl. No.: 10/388,056

(22) Filed: Mar. 12, 2003

(65) Prior Publication Data
US 2004/0179751 A1    Sep. 16, 2004

(51) Int. Cl.
*G06T 3/40* (2006.01)
*G06K 15/00* (2006.01)

(52) U.S. Cl. ................ 358/1.9; 358/3.06
(58) Field of Classification Search .......... 358/3.07, 358/456, 429; 345/667–671; 348/581; 382/298–300
See application file for complete search history.

(56) References Cited

U.S. PATENT DOCUMENTS

| | | | |
|---|---|---|---|
| 5,239,390 A | 8/1993 | Tai | |
| 5,608,538 A | 3/1997 | Edgar et al. | |
| 5,627,953 A | 5/1997 | Yen | |
| H1684 H | 10/1997 | deQueiroz et al. | |
| 5,867,612 A | 2/1999 | Robson | |
| 6,058,222 A | 5/2000 | Hashimoto | |
| 6,226,420 B1 | 5/2001 | Hamill | |
| 6,331,902 B1 | 12/2001 | Lin | |
| 2003/0043414 A1* | 3/2003 | Brady | 358/3.06 |

* cited by examiner

*Primary Examiner*—Aung S. Moe
*Assistant Examiner*—Allen H. Nguyen
(74) *Attorney, Agent, or Firm*—Jon M. Dickinson, PC; Robert D. Varitz, PC

(57) ABSTRACT

Halftone color image down-sampling, performed on a color-channel-by-color-channel basis, with respect to which the selected, overall down-sampling ratio determines whether one or plural down-sampling stage(s) is(are) implemented. If $B<(A-1)$, where A is the original pixel resolution, and B is the intended final resolution, then plural down-sampling steps are conducted. Otherwise, only a single down-sampling stage is involved. Each down-sampling stage involves looking at successive adjacent clusters containing four pixels arranged in row-and-column paired manners, and calculating new down-sampled pixel values based upon a special averaging strategy. In this strategy, if the population of white pixels in each group of four examined pixels is no more than 50-percent, the white pixel values are not included in the calculated average. If white pixels dominate the group, the non-white pixel values are not included in the calculated average.

2 Claims, 1 Drawing Sheet

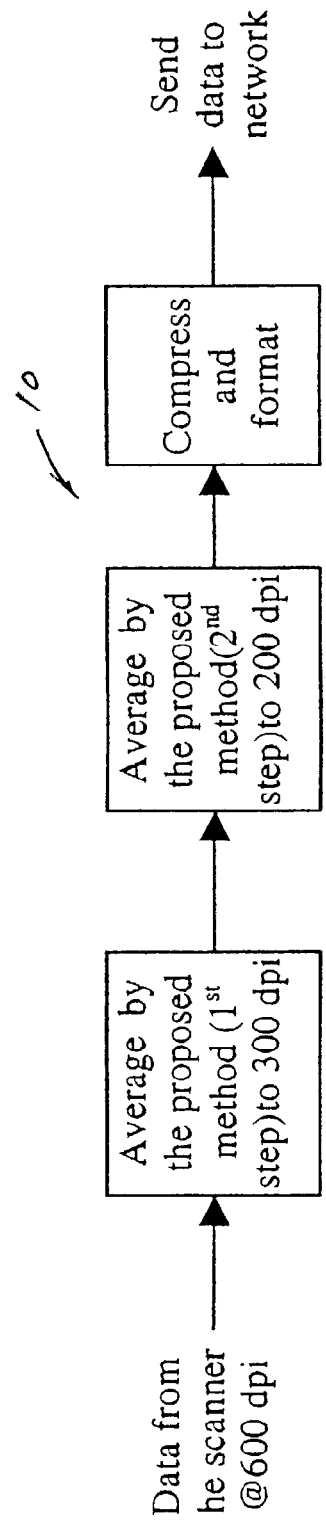
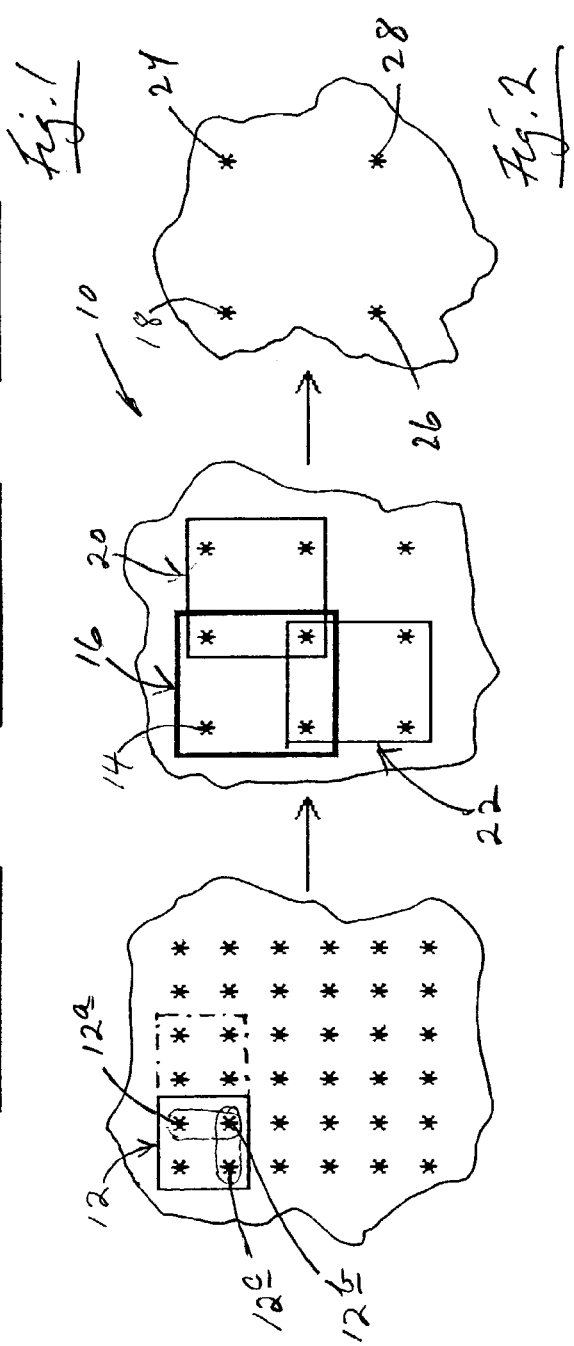

HALFTONE IMAGE DOWN-SAMPLING

This invention relates to scanning a halftone color image, and in particular, to such scanning that effectively permits a down-sampling of the image in a manner which minimizes the production of down-sampling-created aliasing artifacts. While aliasing artifacts may be eliminated as an issue by avoiding down-sampling altogether, down-sampling is relatively widely considered to be necessary when using a network scanner to send images over a network.

Although aliasing problems can arise in a variety of down-sampling situations, the aliasing problem is noticeably severe when the chosen down-sampling ratio is 3:1 or 3:2, or thereabout.

The present invention proposes a new algorithmic approach for achieving down-sampling in certain settings, like that just generally described, in a manner which significantly lessens many aliasing artifact problems. This approach is one which, according to the invention, is implemented on a color-channel-by-color-channel basis for each of the three usual R, G, B color channels.

Proposed according to the invention is a small-image-area averaging technique, which is employed following a predecessor determination of the number of specific down-sampling stages (or steps) that are to be employed. This selection of the number of down-sampling stages to employ (such stages also being referred to herein interchangeably as DS stages), is based upon a selection practice which also forms part of the present invention.

According to the invention, if the DS ratio is expressed, for example, as A:B, where A is the starting resolution in dots-per-inch, and B is the intended final resolution expressed in the same units, then if $B<(A-1)$, a plural-step DS procedure is employed, and if $B=or>(A-1)$, then a single-step procedure is used. For example, if down-sampling is to occur from a resolution of 600-dots-per-inch to 200-dots-per-inch, which describes an overall DS ratio of 3:1, then a plural-step, and specifically a two-step, DS approach is employed in accordance with the invention. In the first DS step, an intermediate ratio of 2:1 is employed to perform a first down-sampling from a resolution of 600-dots-per-inch to 300-dots-per-inch. Thereafter, a second DS step is performed utilizing a DS ratio of 3:2 to change resolution from 300-dots-per-inch to 200-dots-per-inch.

During each such DS step, and on the above-mentioned color-channel-by-color channel basis, small groups of pixels, arranged in clusters of four pixels each which are arrayed in a row-and-column fashion, are selected for inspection and evaluation regarding the respective pixel-color-values of these pixels. From this evaluation an averaging is performed to assign a new pixel value for the down-sampled result (a new pixel), which averaging takes place also on a color-channel-by-color-channel basis, and with special consideration given to how white pixels (color value=255) are handled depending upon the percentage of them present in each group of four (examined) pixels.

The practice of this invention, and the unique way in which it handles many of the down-sampling aliasing problems mentioned above, will become more fully apparent as the description that now follows is read in conjunction with the accompanying drawings.

DESCRIPTION OF THE DRAWINGS

FIG. 1 is a block diagram illustrating a color-image, halftone, down-sampling procedure which achieves an overall down-sampling resolution change from 600-dots-per-inch to 200-dots-per-inch, with down-sampling performed in accordance with this invention in two stages or steps.

FIG. 2 is a graphical illustration showing fragments of arrays of pixels that reflect the pixel-group/cluster examination portion of the down-sampling process which is described and illustrated in FIG. 1.

FIGS. 3 and 4 are two views which describe the special treatment proposed in accordance with practice of the present invention for the "handling" of white pixels during an averaging process which is implemented as a part of down-sampling in accordance with this invention.

FIGS. 2, 3 and 4 collectively describe visually the down-sampling algorithm proposed by the present invention.

DETAILED DESCRIPTION OF THE INVENTION

The approach proposed by the present invention can be described in the following fashion. When a halftone color image is to be down-sampled from one resolution, called the original resolution, to a subsequent final resolution, the ratio of these two resolutions is explored in accordance with the A:B relative size "equations" and relationships mentioned above. If $B<(A-1)$, plural DS steps are performed. Otherwise, only a single DS step is performed. Further in accordance with the invention, and as will now be seen, each DS step is conducted utilizing a common, predetermined averaging strategy which involves pixel-color-value examinations of the individual pixels in selected four-pixel clusters, with special attention paid to the percentage-population of white pixels that are found in those clusters, as will be explained.

Looking at FIGS. 1 and 2 in the drawings, this approach/method to down-sampling is readily seen, and is illustrated at 10. FIG. 1 provides a block/schematic (with words) illustration of the invention methodology, and FIG. 2 a pixel-level pictorial illustration thereof. These two figures represent a halftone color-image down-sampling process in which the overall resolution change is going to produce an overall down-sampling ratio of 3:1. Given this situation, a two-step procedure is implemented, with the first step involving down-sampling from 600-dots-per-inch to 300-dots-per-inch, a two-to-one DS ratio, and with the second step involving down-sampling from 300-dots-per-inch to 200-dots-per-inch, a three-to-two DS ratio.

If one, for just a moment, reflectively isolates each of the two individual DS steps so illustrated with respect to FIGS. 1 and 2, one notes that each individual step meets the criteria for the implementation of but a single down-sampling step. This, of course, is because of the fact that, within each single step, the relationship between beginning and ending resolutions fits the expression $B=or>(A-1)$. It is only because of the fact that the overall DS ratio, from beginning to ending, meets the test $B<(A-1)$, that the overall procedure is characterized, according to the invention, by plural, namely two, steps.

Down-sampling in accordance with this invention takes place on a small area basis, with reference, in all instances, to a "look" being taken at successive clusters of four individual pixels that are arranged in what can be seen to be a row-and-column type arrangement. In each such four-pixel arrangement, and one of these can be seen enclosed within the small, single square which is pictured at 12 in the left-side image in FIG. 2, one will see that there is always included in the examined cluster one pair of directly next-adjacent pixels which are columnar-related, such as those two pixels shown at 12a, 12b, and also one pair of next-adjacent pixels which are row-related, such as pixels 12b, 12c, and that these two pairs share one common pixel, such as pixel 12b. In the down-sampling step which is performed first of all in the illustration of FIGS. 1 and 2, to change resolution from 600-dots-per-inch to 300-dots-per-inch, successive such groups of four pixels are examined to determine the pixel-color-values of these pixels, and this examination is performed for each individual one of the three usual color channels. Thus, what is illustrated in FIGS. 1 and 2, while directly readable to illustrate practice of the invention with respect to a single color channel, should be understood to be representative of what is performed, according to the invention, for each of the three, usual R, G, B color channels.

As will shortly be explained, the pixels in each chosen group of four for examination, are examined for their pixel-color-values, and an averaging strategy is implemented that produces a new down-sampled pixel, or result, wherein the new pixel has a pixel-color-value for that color channel which is based upon that averaging strategy. Down-sampling results from the first step illustrated in FIGS. 1 and 2 are pictured in the central image in FIG. 2. Here, a new pixel 14 (among many new pixels) is the down-sampled pixel result from the cluster in square 12.

With respect to how the groups of four pixels are selected for the down-sampling ratio of 2:1 which is first employed in the illustration now being given, after the four pixels which are contained within square 12 pictured at the left side of FIG. 2 have been averaged to generate the new, resulting single, down-sampled pixel 14, one can envision that square 12 is shifted one entire "group of four pixels" to the right, or directly downwardly if desired, to perform selection determination and averaging of pixel values for the next-adjacent complete set of four pixels. Dash-dot lines next to square 12 indicate how such a to-the-right shift may take place. In other words, in this illustrated stage of 2:1 down-sampling, the groups of pixels which are examined do not overlap one another. Algorithmic steps which may be performed by a scanner to behave in this invention-described manner are easily created in scanning software, utilizing conventional programming practices. Accordingly, and since no specific, pixel-viewing programming approach forms any part of the present invention, programming details are not set forth herein.

When, now, the second DS stage with a different DS ratio is performed, as illustrated in FIGS. 1 and 2, groups of four pixels which, like pixel 14, have resulted from the prior stage of down-sampling, are selected for examination, as illustrated within square 16, and averaging to produce a resulting further down-sampled new pixel, such as pixel 18 pictured in the right side of FIG. 2, is done by examining successive groups of four pixels where overlapping of the groups of four pixels does take place, as is illustrated centrally in FIG. 2 by squares 14 and 20, 22. This overlap of four groups is relevant to the specific down-sampling ratio which is now taking place in the second stage of down-sampling, namely to achieve a down-sampling ratio of 3:2.

The fragmentary image which forms the right side of FIG. 2 illustrates the resulting, overall, down-sampled image. Here, pixels 18, 24, 26, 28 represent the final, overall down-sampled result from all of the pixels shown in the left-hand image in FIG. 2.

Turning attention now to FIGS. 3 and 4, these two figures illustrate the averaging strategy which is employed with regard to every group, or cluster, of four pixels which are examined during each down-sampling step, or stage. FIG. 3 provides an averaging example where the four pixels' respective pixel-color-values are 255, 180, 255 and 190. According to the invention, where white pixels, those that have a value of 255, occupy no more than 50-percent of the group of four pixels examined, these two pixels do not play any role in determining an average value to assign to a new, down-sampled pixel. Thus, in the illustration given in FIG. 3, such averaging results in the selection of a new, down-sampled pixel for the particular color channel involved, and in relation to that pre-down-sampled group of four pixels, with this new pixel having a pixel-color-value in that channel of 185.

FIG. 4 illustrates another situation where, in the cluster of four pixels being examined for averaging purposes, the pixels have respective pixel-color-values of 255, 255, 255, and 190. In this situation, where the number of white pixels in the group being examined is more than 50-percent of the examined group, the non-white pixel, namely, the pixel with the value of 190, is not included in the average, and the result is that the new down-sampled pixel is given the white-pixel-value of 255.

This averaging approach results, among other things, in a down-sampled image having more definitive and crisper edges than one would see in the absence of practice of the present invention.

Accordingly, the unique methodology and practice of the present invention, with respect to improved down-sampling of halftone color images, is fully described and illustrated. While specific examples have been given for just a few specific down-sampling ratios, the rules according to the invention for use of one or plural down-sampling stages, and the averaging technique rules which are employed on a per-color-channel basis for each such down-sampling stage, are clearly set forth, and may be employed readily by those skilled in the art with respect to down-sampling in various other appropriate DS ratios.

We claim:

1. A method for down-sampling a halftone color image having an original resolution value in dots-per-inch comprising acquiring, for each color channel, image-scan pixel data, and utilizing that per-color-channel image-scan data, successively examining different groups of four pixels to determine the respective pixel-color-values of those pixels, wherein each such examined group includes (a) a first pair of next-adjacent pixels that are column-arranged, (b) a second pair of next-adjacent pixels that are row-arranged, and (c) a pixel which is common to and shared by both such pairs, and performing a defined averaging algorithm relative to such determined pixel-color-values in each such group, including, for each such group of four pixels, utilizing the respective pixel-color-values thereof in accordance with the practice of (1) excluding white pixels from the averaging step where the number of white pixels is no more than 50-percent of the group, and (2) excluding non-white pixels from the averaging step where the number of white pixels in the group is greater than 50-percent.

2. A color-channel-specific, small-area, halftone color image down-sampling method comprising determining the intended total down-sampling resolution ratio A:B, where A is the original resolution in dots-per-inch, and B is the intended final resolution, and, for each color channel if $B<(A-1)$, then employing at least a two-step down-sampling procedure, with each step based upon a common, predetermined averaging strategy involving pixel-color-value examinations of the individual pixels in a selected group of four pixels which are deployed in a row-and-column arrangement, and if $B=$ or $>(A-1)$, then employing but a single-step down-sampling procedure, which single step is based upon the same above-mentioned common predetermined averaging strategy, and wherein the averaging strategy employed is such that an average is calculated (a) excluding white pixels from the average where the number of white pixels in the group is no more than 50-percent of the group, and (b) excluding non-white pixels from the averaging step where the number of white pixels in the group is greater than 50-percent.

* * * * *